(12) United States Patent
Pinarbasi et al.

(10) Patent No.: US 7,623,319 B2
(45) Date of Patent: Nov. 24, 2009

(54) ELECTRICAL CONNECTION STRUCTURE FOR MAGNETIC HEADS AND METHOD FOR MAKING THE SAME

(75) Inventors: Mustafa Michael Pinarbasi, Morgan Hill, CA (US); Howard Gordon Zolla, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 737 days.

(21) Appl. No.: 10/999,265

(22) Filed: Nov. 30, 2004

(65) Prior Publication Data

US 2006/0114607 A1 Jun. 1, 2006

(51) Int. Cl.
*G11B 5/17* (2006.01)
*H05K 7/02* (2006.01)
*H05K 7/04* (2006.01)

(52) U.S. Cl. ............... 360/123.1; 361/807; 361/810; 360/123.25

(58) Field of Classification Search ............ 360/123.19, 360/123.24, 123.25, 123.35, 123.36, 123.37, 360/123.1, 123.57; 29/603.02–603.27; 361/807, 361/810
See application file for complete search history.

(56) References Cited

U.S. PATENT DOCUMENTS

| | | | | |
|---|---|---|---|---|
| 3,489,656 A | * | 1/1970 | Balde | 205/125 |
| 5,650,897 A | * | 7/1997 | Cohen et al. | 360/123.37 |
| 6,528,386 B1 | * | 3/2003 | Summerfelt et al. | 438/401 |
| 6,555,858 B1 | * | 4/2003 | Jones et al. | 257/295 |
| 6,603,623 B1 | * | 8/2003 | Fontana et al. | 360/68 |
| 6,747,846 B2 | * | 6/2004 | Kato et al. | 360/234.5 |
| 7,467,458 B2 | * | 12/2008 | Lin | 29/603.01 |
| 2003/0098179 A1 | * | 5/2003 | Obata et al. | 174/262 |
| 2003/0214761 A1 | * | 11/2003 | Freitag et al. | 360/322 |
| 2004/0179312 A1 | * | 9/2004 | Freitag et al. | 360/324.12 |
| 2004/0228047 A1 | * | 11/2004 | Cyrille et al. | 360/324.12 |
| 2005/0007705 A1 | * | 1/2005 | Dobisz et al. | 360/324.1 |
| 2005/0024773 A1 | * | 2/2005 | Lille | 360/128 |

* cited by examiner

*Primary Examiner*—Andrea L Wellington
*Assistant Examiner*—Adam B Dravininkas
(74) *Attorney, Agent, or Firm*—John J. Oskorep, Esq.; Rambod Nader

(57) ABSTRACT

An electrically conductive etch stop layer is formed over a first electrically conductive layer. An electrically conductive diffusion barrier layer is then formed over the etch stop layer, followed by the formation of an insulator layer over the diffusion barrier layer. Utilizing an etching process with a patterned photoresist in place, insulator materials in a central region are removed to form a via which exposes electrically conductive materials in the central region. Finally, a second electrically conductive layer is formed within the via over the electrically conductive materials in the central region.

21 Claims, 10 Drawing Sheets

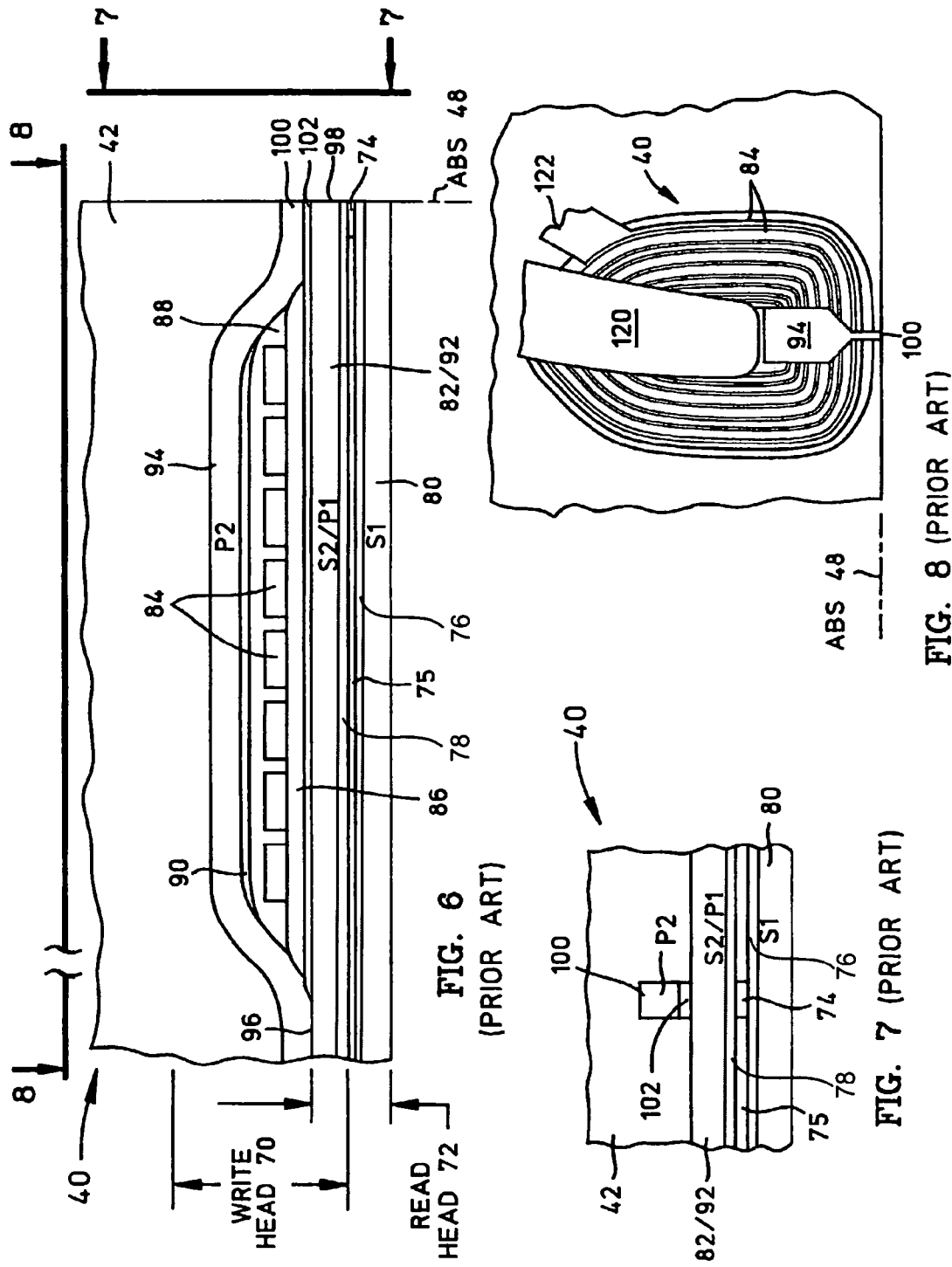

ELECTRICAL CONNECTION STRUCTURE FOR MAGNETIC HEADS AND METHOD FOR MAKING THE SAME

BACKGROUND

1. Field of the Technology

This invention relates generally to electrical connection structures for magnetic recording devices, and more particularly to an electrical connection structure having an electrically conducting diffusion barrier layer which reduces or eliminates oxidation of a top surface of an electrically conductive etch stop layer of the electrical connection structure.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is written on concentric, radially spaced tracks on the disk surfaces by a write head, and is then read by a read head. Thin film magnetic heads are primarily used in magnetic storage systems to write/read information in the form of magnetic pulses to/from the disk. A magnetic transducer, such as an inductive or magnetoresistive head (e.g. MR or GMR type), includes a read sensor which detects a magnetic field through the change in the resistance of its sense layer as a function of the strength and direction of the magnetic flux being sensed by the sense layer. The magnetic head is typically formed on a slider which is then mounted to a suspension arm of an actuator. The suspension arm suspends the head in close proximity to a disk surface.

Electrical current flows through the read sensor through low electrical resistance paths known in the art as lead layer structures. These lead layer structures are terminated at the trailing edge of the slider and are connected to an electrical current source through electrical connections known in the art as "vias". When the electrical connections include a metal that is prone to oxidation, the surface oxide can impede the flow of the electrical current through any via utilized for the electrical connection.

One example is an electrical connection structure which includes copper (Cu) and tantalum (Ta), where the Ta is utilized as an etch stop layer. In this example, a lead/shield layer of nickel-iron (NiFe) needs to make electrical contact with the lead layer structure through the via. During the fabrication process, the top surface of the Ta is exposed to oxygen whereby the surface of the Ta oxidizes, thereby becoming electrically resistant. If the lead/shield layer is subsequently deposited in contact with this oxidized surface then a parasitic resistance results.

One known solution utilizes in-situ sputter cleaning or in-situ ion milling prior to the deposition of the lead/shield layer. Disadvantages of this approach include an increased likelihood of damage to other structures in the magnetic head. Specifically, in the above example, a read gap layer is damaged and/or thinned by the sputter cleaning or ion-milling. This damage reduces the desired characteristics of mechanical stability, chemical stability, and low contact resistivity.

Accordingly, what are needed are improved electrical connection structures for magnetic recording devices and methods of making the same.

SUMMARY

An electrical connection structure suitable for use in a magnetic head and disk drive, as well as a method of making the same are described herein. An electrically conductive etch stop layer is formed over a first electrically conductive layer. An electrically conductive diffusion barrier layer is then formed over the electrically conductive etch stop layer, followed by the formation of an insulator layer over the electrically conductive diffusion barrier layer. Next, a patterned photoresist is formed over left and right regions of the insulator layer so as to expose a central region of the insulator layer. Utilizing an etching process with the patterned photoresist in place, insulator materials of the insulator layer in the central region are removed to form a via which exposes electrically conductive materials in the central region. Finally, a second electrically conductive layer is formed within the via over the electrically conductive materials in the central region. Advantageously, the electrically conductive diffusion barrier layer reduces or eliminates oxidation of a top surface of the electrically conducting etch stop layer during the formation of the electrical connection.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 6 is a partial view of the slider and a merged magnetic read head as seen in plane 6-6 of FIG. 2;

FIG. 7 is a partial ABS view of the slider taken along plane 7-7 of FIG. 6 to show the read and write elements of the merged magnetic read head;

FIG. 8 is a view taken along plane 8-8 of FIG. 6 with all material above the coil layer and leads removed;

DETAILED DESCRIPTION OF THE PREFERRED EMBODIMENTS

An electrical connection structure suitable for use in a magnetic head and disk drive, as well as a method of making the same are described herein. An electrically conductive etch stop layer is formed over a first electrically conductive layer. An electrically conductive diffusion barrier layer is then formed over the electrically conductive etch stop layer, followed by the formation of an insulator layer over the electrically conductive diffusion barrier layer. Next, a patterned photoresist is formed over left and right regions of the insulator layer so as to expose a central region of the insulator layer. Utilizing an etching process with the patterned photoresist in place, insulator materials of the insulator layer in the central region are removed to form a via which exposes electrically conductive materials in the central region. Finally, a second electrically conductive layer is formed within the via over the electrically conductive materials in the central region. Advantageously, the electrically conductive diffusion barrier layer reduces or eliminates oxidation of a top surface of the electrically conducting etch stop layer during the formation of the electrical connection.

The following description is the best embodiment presently contemplated for carrying out the present invention. This description is made for the purpose of illustrating the general principles of the present invention and is not meant to limit the inventive concepts claimed herein.

Figure 1:
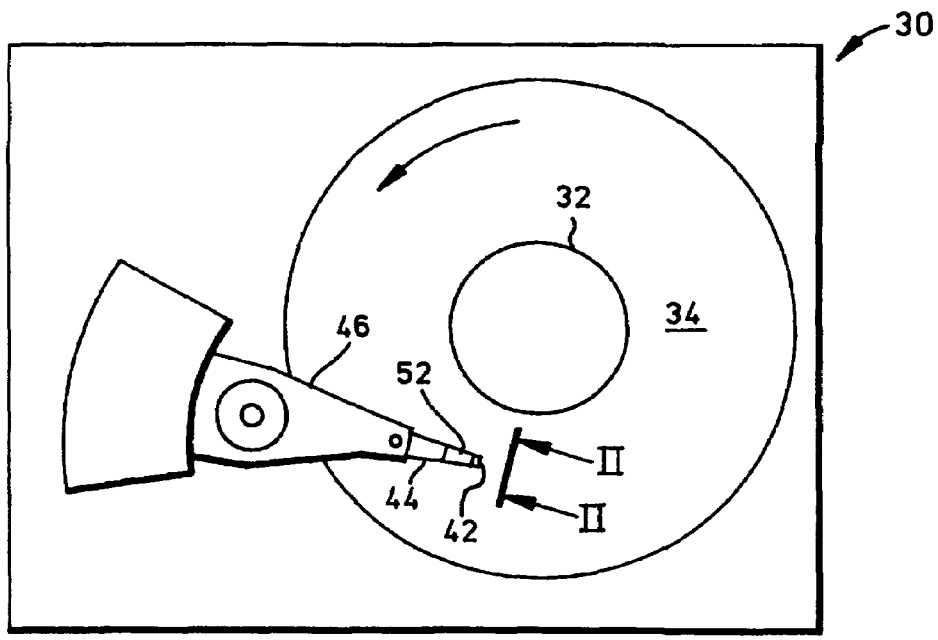
FIG. 1 is a plan view of an exemplary magnetic disk drive.
Figure 2:
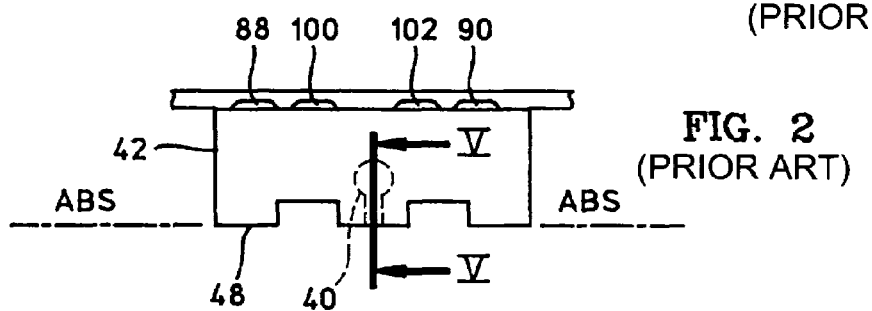
FIG. 2 is an end view of a slider with a magnetic read head of the disk drive as seen in plane 2-2 of FIG. 1.
Figure 3:
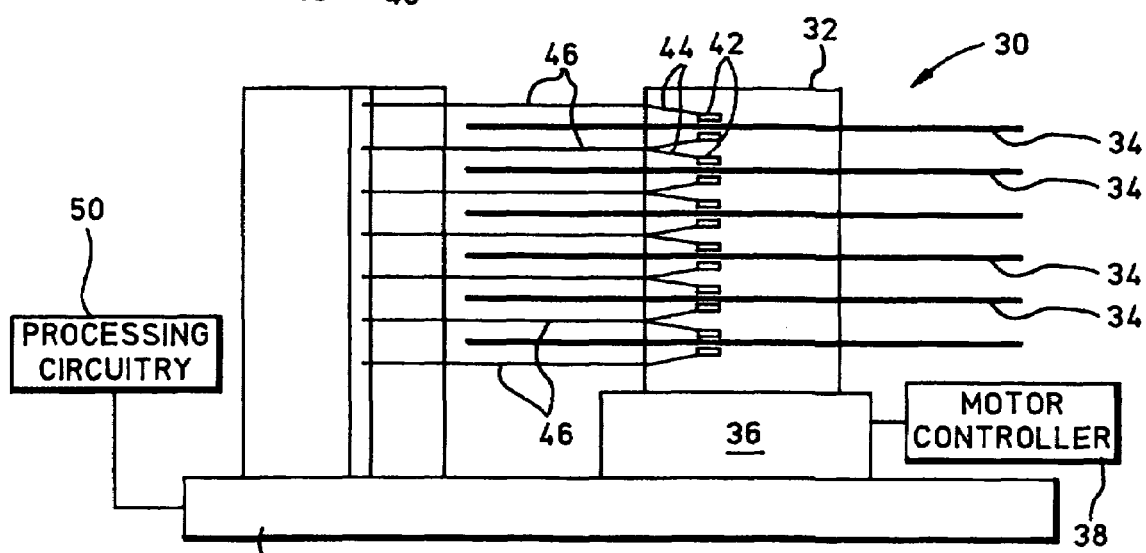
FIG. 3 is an elevation view of the magnetic disk drive wherein multiple disks and magnetic read heads are employed.
Figure 4:
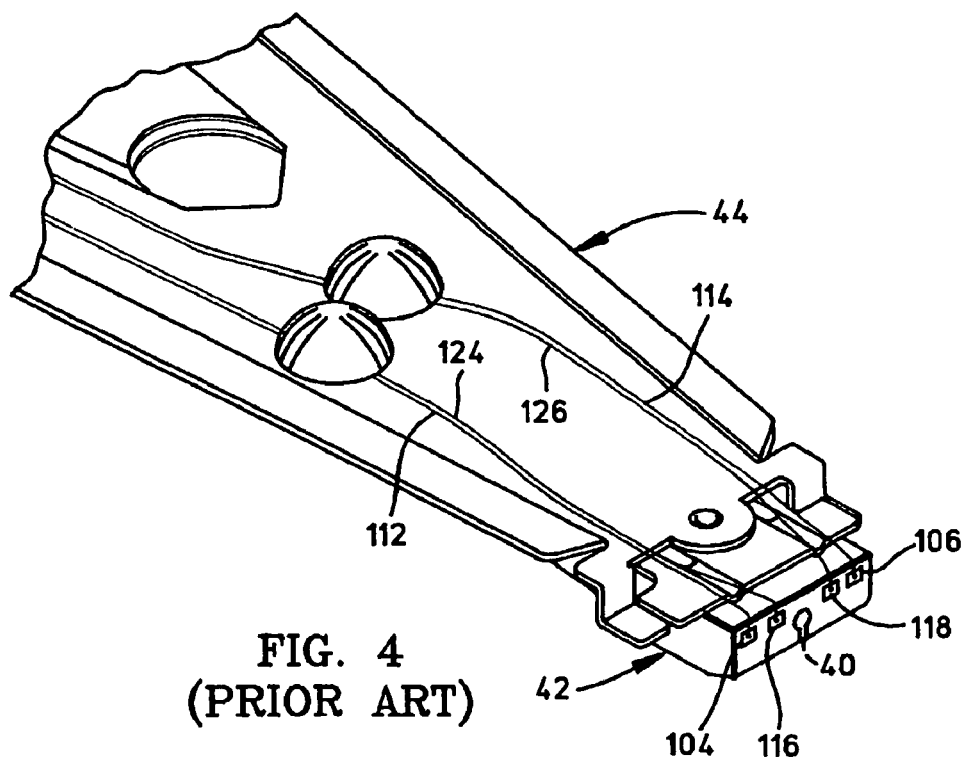
FIG. 4 is an isometric illustration of an exemplary suspension system for supporting the slider and magnetic read head.
Figure 5:
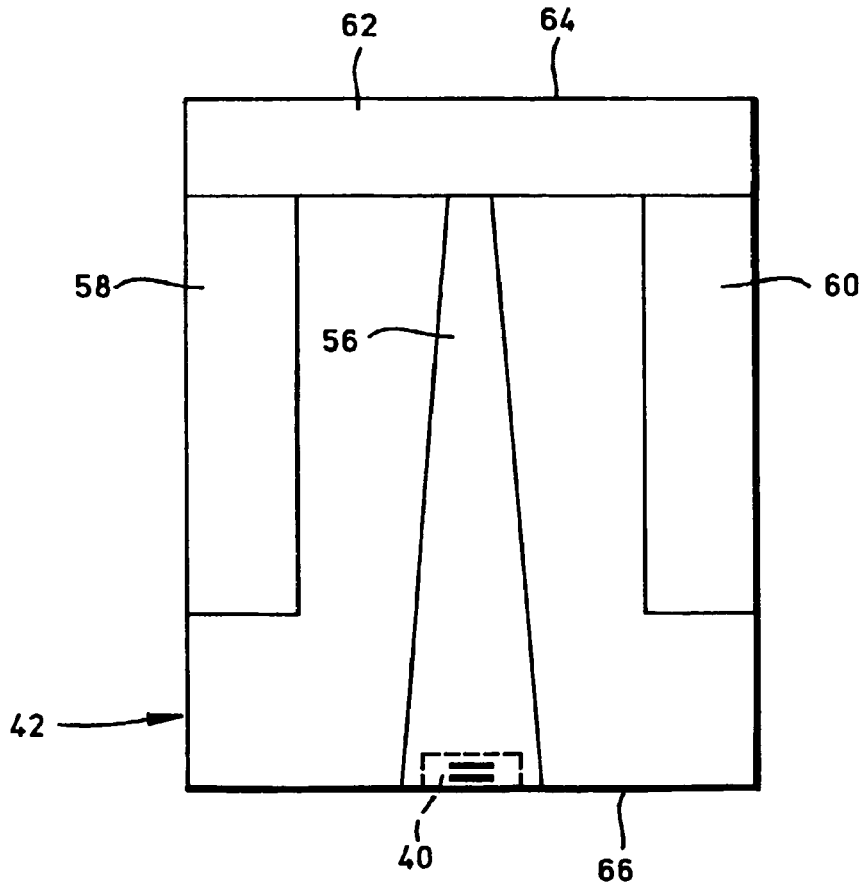
FIG. 5 is an air bearing surface (ABS) view of the magnetic read head taken along plane 5-5 of FIG. 2.

Referring now to the drawings wherein like reference numerals designate like or similar parts throughout the several views, FIGS. 1-3 illustrate a magnetic disk drive 30. Disk drive 30 includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. Magnetic head 40 may utilize the sensor which is made in accordance with the present invention. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin (typically, 0.05 μm) cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing 55, as shown in FIG. 3. FIG. 5 is an ABS view of slider 42 and magnetic head 40. Slider 42 has a center rail 56 that supports magnetic head 40, and side rails 58 and 60. Rails 56, 58 and 60 extend from a cross rail 62. With respect to rotation of magnetic disk 34, cross rail 62 is at a leading edge 64 of slider 42 and magnetic head 40 is at a trailing edge 66 of slider 42.

FIG. 6 is a side cross-sectional elevation view of a merged magnetic head 40, which includes a write head portion 70 and a read head portion 72. Read head portion 72 includes a giant magnetoresistive (GMR) read head which utilizes a GMR sensor 74. Alternatively, GMR sensor 74 may be of the anisotropic magnetoresistive (AMR) or tunneling magnetoresistive (TMR) type. FIG. 7 is an ABS view of FIG. 6. GMR sensor 74 is sandwiched between nonmagnetic electrically insulative first and second read gap layers 76 and 78, and read gap layers 76 and 78 are sandwiched between ferromagnetic first and second shield layers 80 and 82. In response to external magnetic fields, the resistance of GMR sensor 74 changes. A sense current $I_s$ conducted through the sensor causes these resistance changes to be manifested as potential changes. These potential changes are then processed as readback signals by processing circuitry 50 shown in FIG. 3.

Write head portion 70 of magnetic head 40 includes a coil layer 84 sandwiched between first and second insulation layers 86 and 88. A third insulation layer 90 may be employed for planarizing the head to eliminate ripples in the second insulation layer caused by coil layer 84. The first, second and third insulation layers are referred to in the art as an "insulation stack". Coil layer 84 and first, second and third insulation layers 86, 88 and 90 are sandwiched between first and second pole piece layers 92 and 94. First and second pole piece layers 92 and 94 are magnetically coupled at a back gap 96 and have first and second pole tips 98 and 100 which are separated by a write gap layer 102 at the ABS. Since second shield layer 82 and first pole piece layer 92 are a common layer, this head is known as a merged head. In a piggyback head an insulation layer is located between a second shield layer and a first pole piece layer. As shown in FIGS. 2 and 4, first and second solder connections 104 and 106 connect lead layer structures 75 from spin valve sensor 74 to leads 112 and 114 on suspension 44, and third and fourth solder connections 116 and 118 connect leads 120 and 122 from the coil 84 (see FIG. 8) to leads 124 and 126 on suspension 44.

Figure 9:
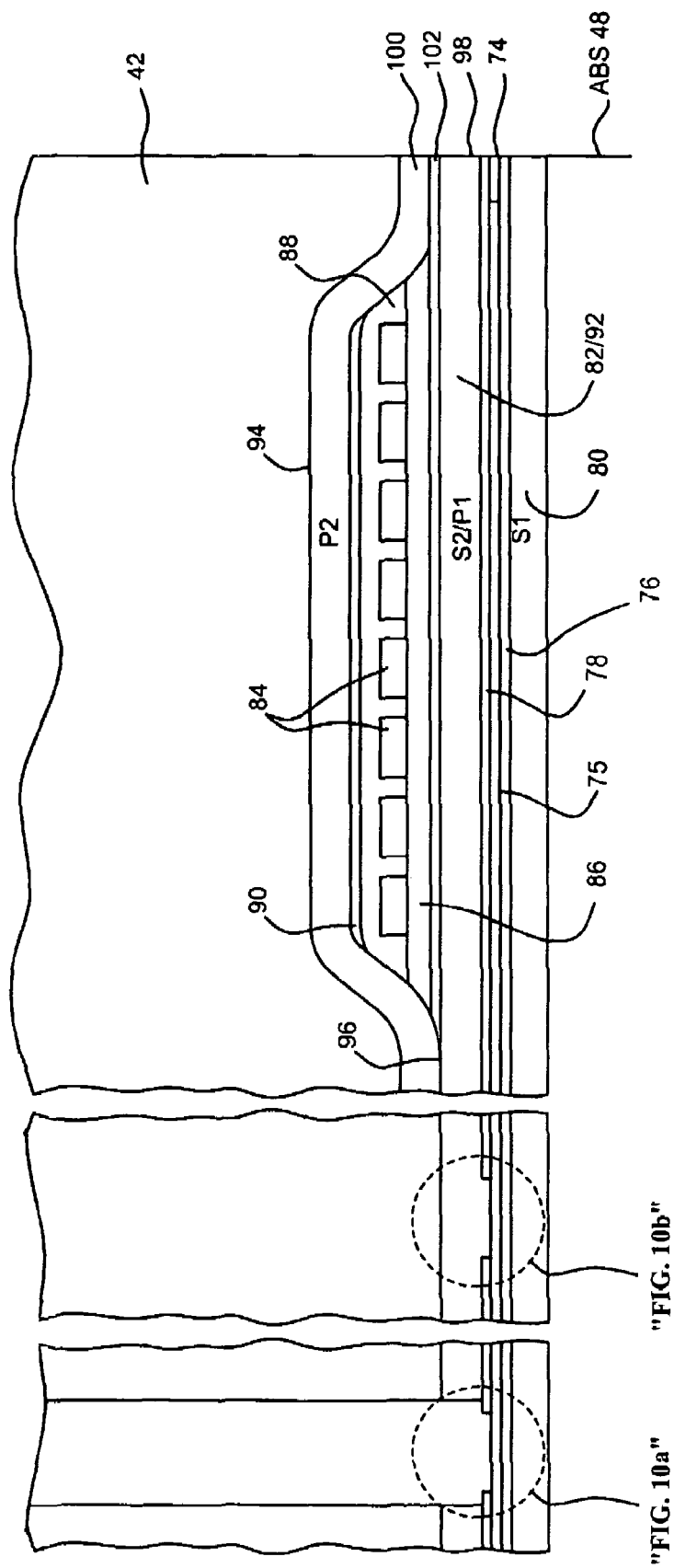
FIG. 9 is the same as that shown in FIG. 6 but illustrates electrical connection structures for use in the magnetic head.

FIG. 9 is a side cross-sectional elevation view of a merged magnetic head 40, which shows electrical connection structures for use in the magnetic head. Electrical connection structures 980 and 990 indicated by "FIG. 10*a*" and "FIG. 10*b*", respectively, in FIG. 9 allows electrical current to flow between lead layer structures 75 from the read sensor and an electrically conductive layer at a via site of merged magnetic head 40.

Figure 10A:
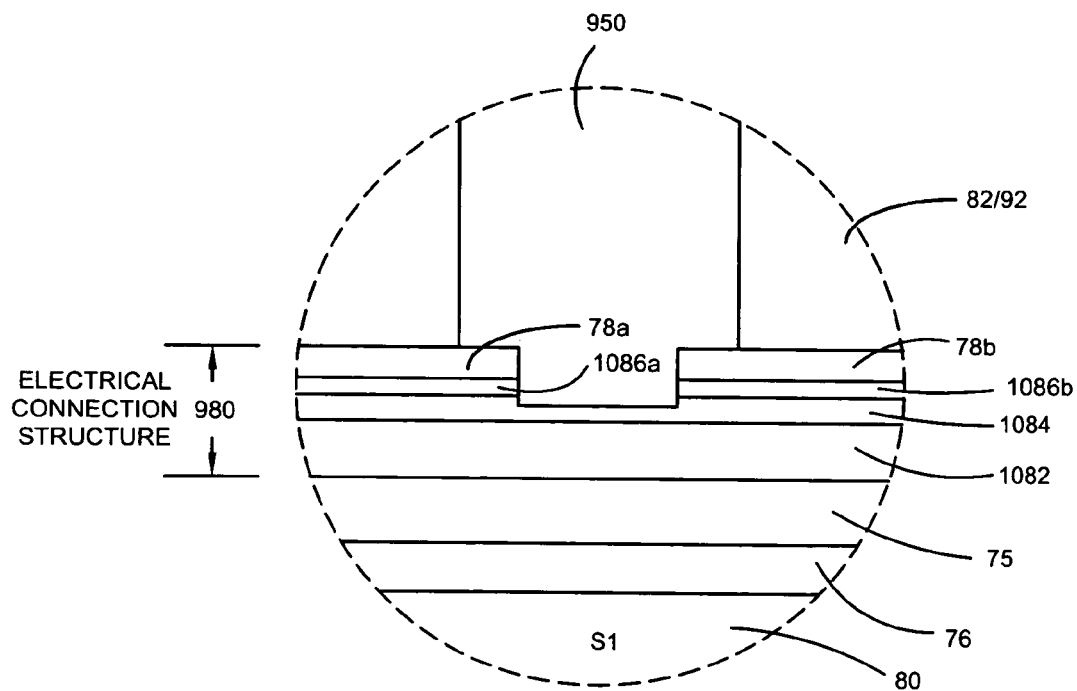
FIGS. 10a and 10b are schematic and enlarged views of the electrical connection structures of FIG. 9.

Referring to FIG. 10*a*, located in a region marked as "FIG. 10*a*" in FIG. 9, electrical connection structure 980 is shown in enlarged view. Electrical connection structure 980 is formed over lead layer structures 75. First read gap layer 76 is formed between first shield layer 80 below and lead layer structures 75 above it. Electrical connection structure 980 includes a first electrically conductive layer 1082, made of copper (Cu), located between lead layer structures 75 and an electrically conductive etch stop layer 1084 made of tantalum (Ta). Electrically conductive etch stop layer 1084 is located between first electrically conductive layer 1082 and an electrically conductive diffusion barrier layer 1086, made of ruthenium (Ru). Electrically conductive diffusion barrier layer 1086 is located between electrically conductive etch stop layer 1084 and second read gap layer 78. Second read gap layer 78 serves as an insulator layer. Electrically conductive etch stop layer 1084 is used to protect first electrically conductive layer 1082 from damage during formation of a subsequently deposited conductive stud 950. Conductive stud 950, made from nickel-iron, (NiFe) serves as a second electrically conductive layer, and at least a portion of this second electrically conductive layer is formed between left and right insulator material portions of the insulator layer.

Figure 10B:
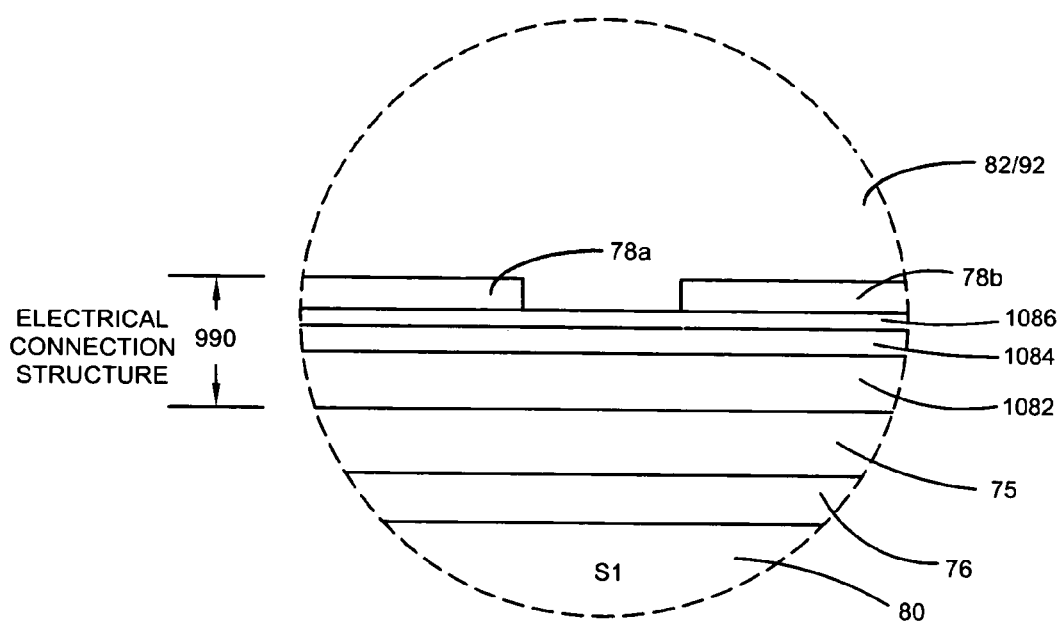

Alternatively, as shown in FIG. 10*b*, a second electrically conductive layer of electrical connection structure 990 is layer 82/92 including second shield layer 82 and first pole piece layer 92. In this example, electrically conductive diffusion barrier layer 1086 is used as an oxidation barrier layer for electrically conductive etch stop layer 1084, so that a remote portion of layer 82/92 serves as the second electrically conductive layer.

Figure 11:
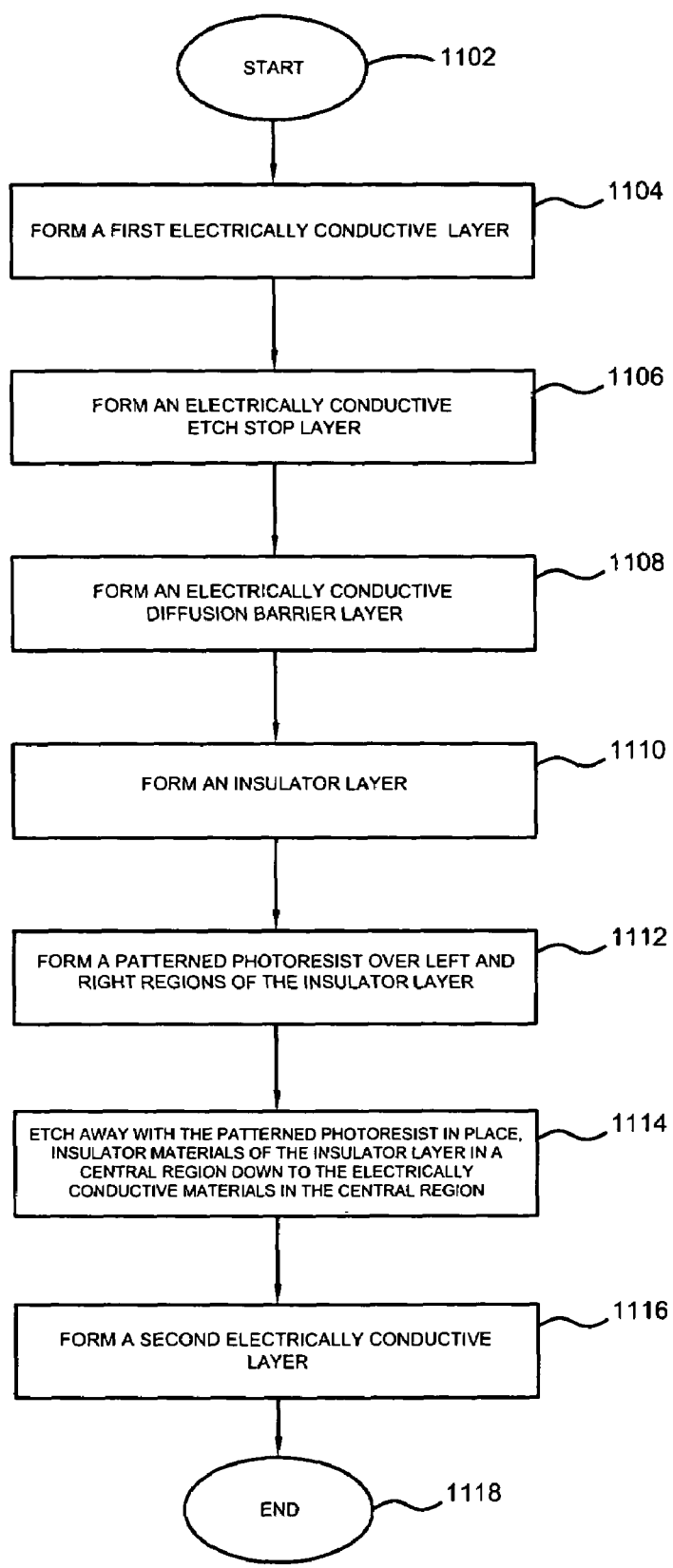
FIG. 11 is a flowchart which describes a fabrication process for the electrical connection structure which has a diffusion barrier layer which acts an oxidation barrier.

FIG. 11 is a flowchart which describes a fabrication process for an electrical connection structure having a diffusion barrier layer which acts an oxidation barrier to an etch stop layer within the connection. First, a first electrically conductive layer is formed (step 1104 of FIG. 11). Next, an electrically conductive etch stop layer is formed over the first electrically conductive layer (step 1106 of FIG. 11). The etch stop layer will be used to inhibit or reduce any etching beyond this layer when a subsequent etching process is employed. An electrically conductive diffusion barrier layer is then formed over the electrically conductive etch stop layer (step 1108 of FIG. 11). Next, an insulator layer is formed over the electrically conductive diffusion barrier layer (step 1110 of FIG. 11). A patterned photoresist is then formed over left and right regions of the insulator layer such that a central region of the insulator layer is exposed (step 1112 of FIG. 11).

Utilizing an etching process with the patterned photoresist in place, insulator materials of the insulator layer in the central region are removed to form a via which exposes electrically conductive materials in the central region (step 1114 of FIG. 11). The etching process may be performed until the etch stop layer is reached. Finally, a second electrically conductive layer is formed within the via over the electrically conductive materials in the central region (step 1116 of FIG. 11). Advantageously, the electrically conductive diffusion barrier layer reduces or eliminates oxidation of a top surface of the electrically conducting etch stop layer when the structure is exposed to open air or oxygen during fabrication.

FIGS. 12-19 are cross-sectional views of partially formed electrical connection structure constituents corresponding to the steps described in the flowchart of FIG. 11, which help describe in detail the method of forming the electrical connection structure of the present application. The method of FIGS. 12-19 may be utilized while forming electrical connection structures in a magnetic head as described above in relation to FIGS. 1-9; however the method is not limited to forming electrical connections in magnetic heads but may be applied to the formation of any suitable device. The electrical connection structure will have the final structure shown and described in relation to FIG. 19.

As described previously, electrical current flows through a read sensor through low electrical resistance paths known in the art as lead layer structures. These lead layer structures are terminated at the trailing edge of the slider and are connected to an electrical current source through electrical connections known in the art as "vias". When the electrical connections include a metal that is prone to oxidation, the surface oxide can impede the flow of the electrical current through any via utilized for the electrical connection. One example is an electrical connection structure which includes Cu and Ta, where the Ta is utilized as an etch stop layer. In this example, a lead/shield layer of NiFe needs to make electrical contact with the lead layer structure through the via. During the fabrication process, the top surface of the Ta is exposed to oxygen whereby the surface of the Ta oxidizes, thereby becoming electrically resistant. If the lead/shield layer is subsequently deposited in contact with this oxidized surface then a parasitic resistance results. One known solution known in the art utilizes in-situ sputter cleaning or in-situ ion milling prior to the deposition of the lead/shield layer. Disadvantages of this approach include an increased likelihood of damage to other structures in the magnetic head. Specifically, in the above example, a read gap layer is damaged and/or thinned by the sputter cleaning or ion-milling. This damage reduces the desired characteristics of mechanical stability, chemical stability, and complete electrical isolation. Using techniques in the present application, an electrically conducting diffusion barrier layer reduces or eliminates oxidation of a top surface of an electrically conductive etch stop layer of the electrical connection structure.

Figure 12:
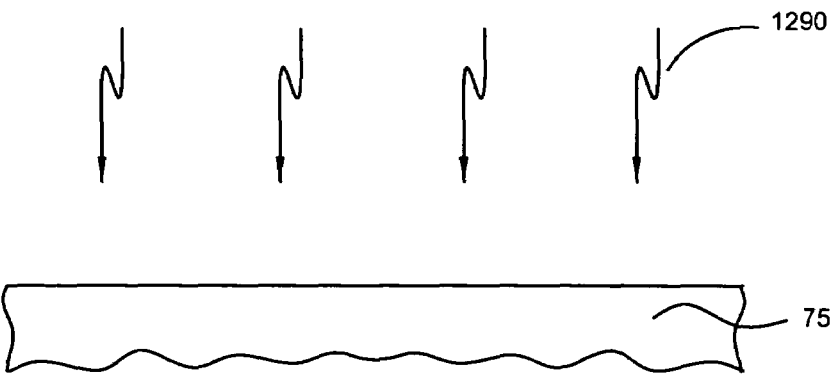
FIG. 12 is the first in a series of cross-sectional views of FIGS. 12-19 of partially formed electrical connection structure constituents corresponding to the steps described in the flowchart of FIG. 1, showing a lead layer structure of the merged magnetic head.

Beginning with FIG. 12, lead layer structures 75 are shown. Lead layer structures 75 may be one of the structures of write head portion 70 of magnetic head 40 originating from FIG. 6. Preferably, lead layer structures 75 are made of Cu, but alternatively are made with any suitable conductive material. Lead layer structures 75 may vary in thickness between, for example, about 100-300 nm, and in the present embodiment have a thickness of about 200 nm.

Figure 13:
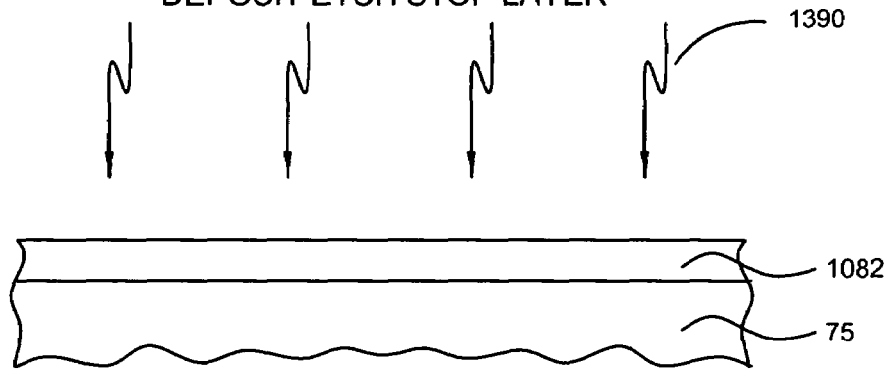
FIG. 13 is the second in a series of cross-sectional views of FIGS. 12-19 of partially formed electrical connection structure constituents corresponding to the steps described in the flowchart of FIG. 1, which is the same as that shown in FIG. 12 except that a first electrically conductive layer is formed over and on-top of the lead layer structure.

In FIG. 13, first electrically conductive layer 1082 is shown to be formed over lead layer structures 75 from a previous deposition process 1290 of FIG. 12. Preferably, first electrically conductive layer 1082 is sputter deposited on top of lead layer structures 75, but alternatively other suitable deposition techniques may be used. In the present embodiment, first electrically conductive layer 1082 is made of Cu, but may be alternatively made of any suitable conductive material such as Au. First electrically conductive layer 1082 may vary in thickness between, for example, about 100-5000 Å, and in the present embodiment has a thickness of about 1500 Å.

Figure 14:
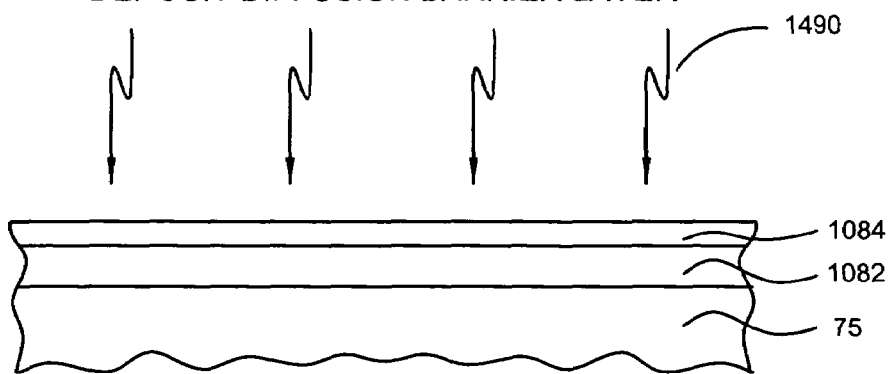
FIG. 14 is the third in a series of cross-sectional views of FIGS. 12-19 of partially formed electrical connection structure constituents corresponding to the steps described in the flowchart of FIG. 11, which is the same as that shown in FIG. 13 except that an electrically conductive etch stop layer is formed over and on-top of the first electrically conductive layer.

Next, in FIG. 14, electrically conductive etch stop layer 1084 is formed over first electrically conductive layer 1082 from a previous deposition process 1390 of FIG. 13. The etch stop layer will be used to inhibit or reduce any etching beyond this layer when a subsequent etching process' is employed (described later in relation to etching process 1790 of FIG. 17). Alternatively, electrically conductive etch stop layer 1084 maybe used as a cap layer for the structure. Preferably, electrically conductive etch stop layer 1084 is sputter deposited on top of electrically conductive layer 1082. In the present embodiment, electrically conductive etch stop layer 1084 is made of Ta, but alternatively may made with any suitable conductive material such as chromium (Cr), molybdenum (Mo), titanium (Ti) or tungsten (W). Electrically conductive etch stop layer 1084 may vary in thickness between, for example, about 50-500 Å, and in the present embodiment has a thickness of about 150 Å.

Figure 17:
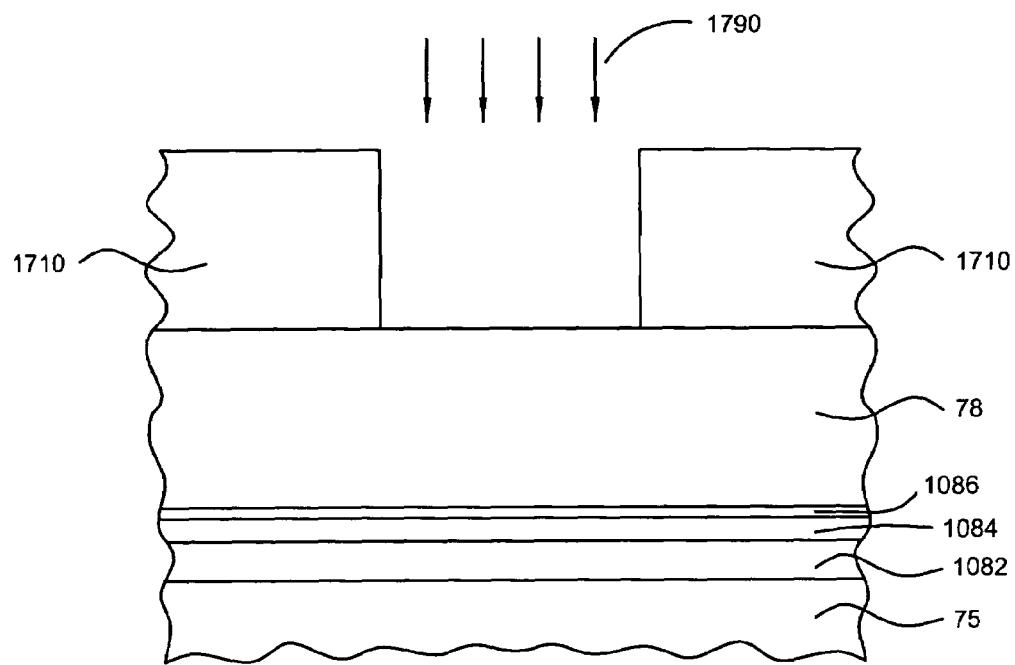
FIG. 17 is the sixth in a series of cross-sectional views of FIGS. 12-19 of partially formed electrical connection structure constituents corresponding to the steps described in the flowchart of FIG. 11, which is the same as that shown in FIG. 16 except that a patterned photoresist is formed over left and right regions of the insulator layer to thereby expose a central region of the insulator layer.

In general, electrically conductive etch stop layer 1084 is a layer of material that is resistant to etching process 1790 of FIG. 17 in the fabrication of the electrical connection structure of the present invention. Put another way, electrically conductive etch stop layer 1084 is not etchable very easily and has a better selectivity than first electrically conductive layer 1082 formed below it. Electrically conductive etch stop layer 1084 does not degrade the performance of the electrical connection structure and may in fact enhance the electrical connection's performance.

During a conventional fabrication process, the Cu/Ta structure is brought into air whereby the surface of the Ta oxidizes to become electrically resistant. Any subsequently deposited electrically conducting layer formed in contact with this oxidized surface results in a parasitic resistance in the electrical connection. This provides an ineffective electrical connection.

Figure 15:
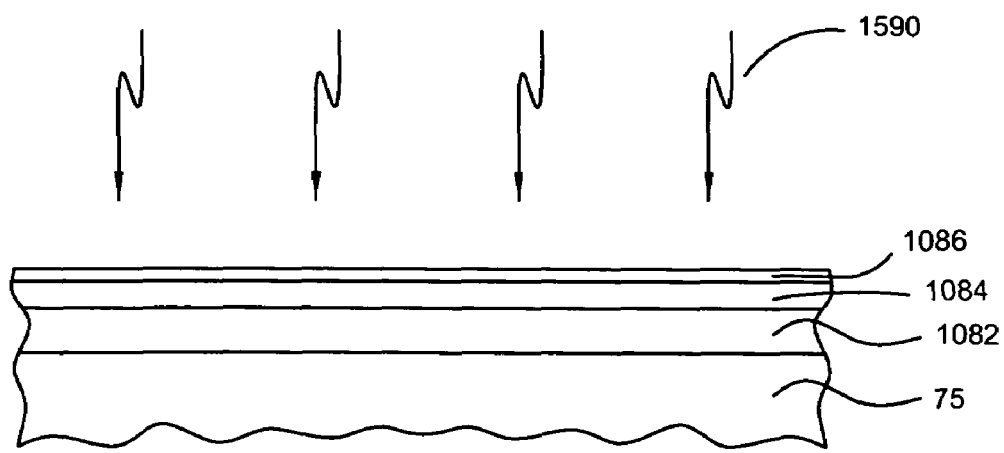
FIG. 15 is the fourth in a series of cross-sectional views of FIGS. 12-19 of partially formed electrical connection structure constituents corresponding to the steps described in the flowchart of FIG. 1, which is the same as that shown in FIG. 14 except that an electrically conductive diffusion barrier layer is formed over and on-top of the electrically conductive etch stop layer.

In FIG. 15, electrically conductive diffusion barrier layer 1086 is formed over electrically conductive etch stop layer 1084 from a previous deposition process 1490 of FIG. 14. In the present embodiment, electrically conductive diffusion barrier layer 1086 is used as an oxidation barrier layer for the previously deposited electrically conductive etch stop layer 1084. Preferably, electrically conductive diffusion barrier layer 1086 is sputter deposited on top of electrically conductive etch stop layer 1084, but alternatively other suitable deposition techniques may be used. In the present embodiment, electrically conductive diffusion barrier layer 1086 is made of ruthenium (Ru). Alternatively, electrically conductive diffusion barrier layer 1086 may be made with any suitable conductive and oxidation-resistant material. Electrically conductive diffusion barrier layer 1086 may vary in thickness between, for example, about 5-100 Å, and in the present embodiment has a thickness of about 30 Å. Note that any suitable thickness adapted to photoresist a diffusion of oxygen ($O_2$) from air to the previously deposited electrically conductive etch stop layer 1084 may be utilized. Note that electrically conductive etch stop layer 1084 and electrically conducting diffusion barrier layer 1086 have two distinct and different etching properties.

Figure 16:
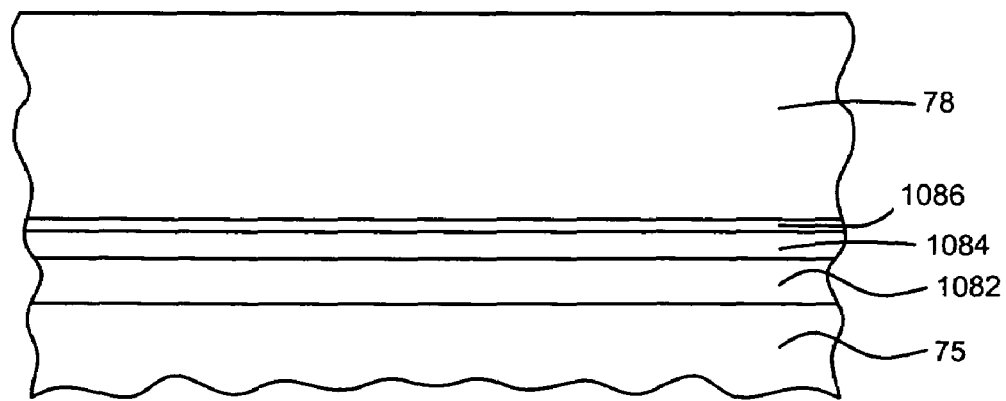
FIG. 16 is the fifth in a series of cross-sectional views of FIGS. 12-19 of partially formed electrical connection structure constituents corresponding to the steps described in the flowchart of FIG. 11, which is the same as that shown in FIG. 15 except that an insulator layer is formed over and on-top of the electrically conductive diffusion barrier layer.

Next, in FIG. 16, insulator layer 78 is formed over electrically conductive diffusion barrier layer 1086 from a previous deposition process 1590 of FIG. 15. Preferably, insulator layer 78 is sputter deposited on top of electrically conductive diffusion barrier layer 1086, but alternatively other suitable deposition techniques may be used. In the present embodiment, insulator layer 78 is made of alumina ($Al_2O_3$), but alternatively may be made with any suitable insulator material such as silicon dioxide ($SiO_2$), silicon nitride ($Si_3N_4$), aluminum nitride (AlN), zirconium oxide (ZrO), hafnium oxide (HfO), and yttrium oxide (YtO). In the present embodiment, insulator layer 78 is of a two layer construction. Insulator layer 78 may vary in thickness between, for example, about 200-1000 Å, and in the present embodiment has a thickness of about 900 Å.

Figure 18:
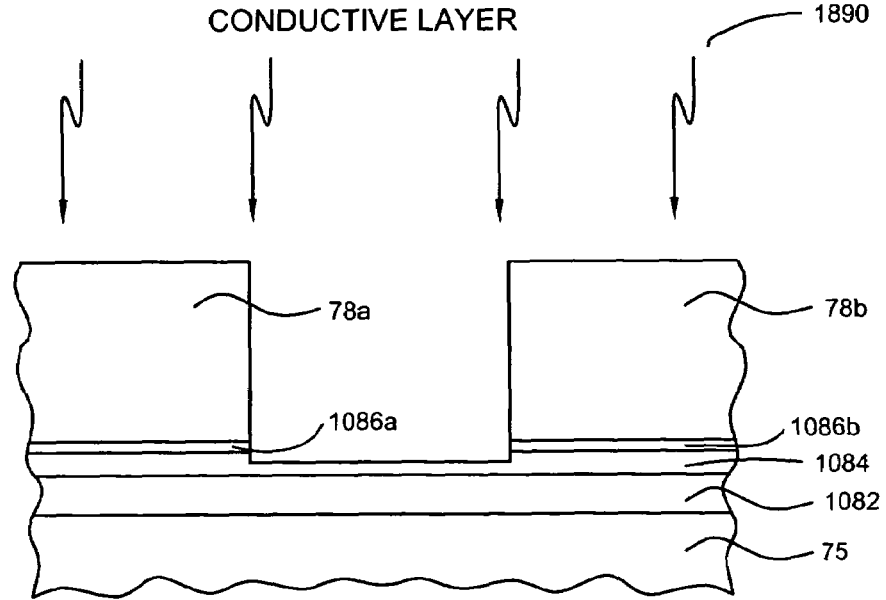
FIG. 18 is the seventh in a series of cross-sectional views of FIGS. 12-19 of partially formed electrical connection structure constituents corresponding to the steps described in the flowchart of FIG. 11, which is the same as that shown in FIG. 17 except that insulator materials of the insulator layer are etched away in the central region down to electrically conductive materials in the central region from a previous etching process.

Next in FIG. 17 it is shown that a patterned photoresist structure 1710 is formed over left and right regions, respectively, of insulator layer 78 to thereby expose a central region of insulator layer 78. Photoresist structure 1710 may vary in thickness between, for example, about 0.5-30 μm, and in the present embodiment has a thickness of about 5 μm. With patterned photoresist structure 1710 in place, an etching process 1790 is performed to remove insulator materials of insulator layer 78 in the central region to form a via as shown in FIG. 18. The bottom of the via exposes electrically conducting materials previously deposited, including electrically conducting etch stop layer 1084 and electrically conductive diffusion barrier layer 1086. Note that insulator layer 78 is shown to be two distinct insulator material portions 78a and 78b. Also, electrically conductive diffusion barrier layer 1086 is shown to be two distinct diffusion barrier layer portions 1086a and 1086b. In the present embodiment, etching process 1790 is a "wet" etch utilizing ammonium hydroxide ($NH_3OH$) as the most suitable chemical. Alternatively, any suitable chemical etchant may be used. Also alternatively, other removal etch processes may be used including, reactive ion etching (RIE).

Figure 19A:
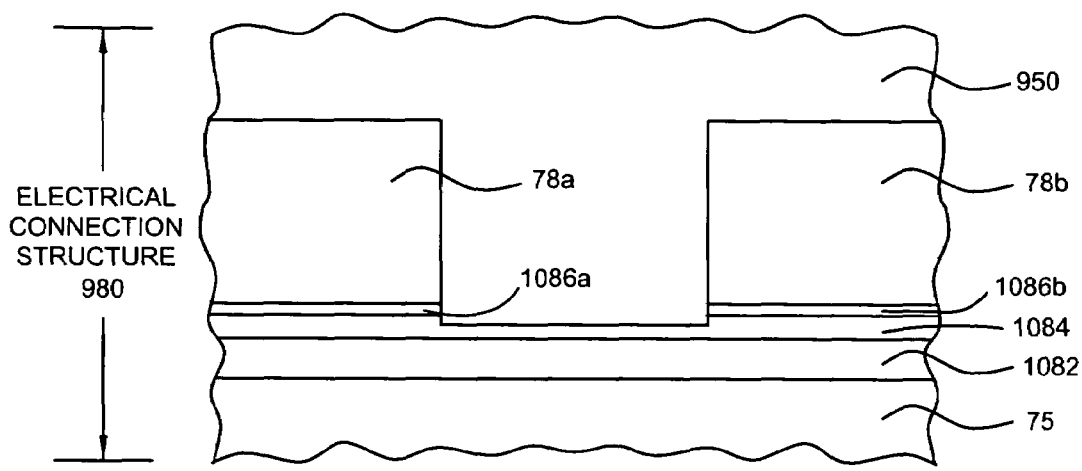
FIGS. 19a and 19b are the eighth and final in a series of cross-sectional views of FIGS. 12-19 of partially formed electrical connection structure constituents corresponding to the steps described in the flowchart of FIG. 11, which is the same as that shown in FIG. 18 except that a second electrically conductive layer is formed over the insulator materials and the electrically conductive materials in the central region.

Next in FIG. 19a, corresponding to FIG. 10a, completed electrical connection structure 980 is shown. As previously discussed, electrically conductive etch stop layer 1084 is used to protect first electrically conductive layer 1082 from damage during formation of subsequently deposited conductive stud 950 from a deposition process 1890, as shown in FIG. 18. As discussed previously, conductive stud 950 serves as the second electrically conductive layer and is formed over insulator material portions 78a and 78b and within the via over the electrically conductive materials in the central region. Since it is at least partially contained within the via, conductive stud 950 is formed between insulator material portions 78a and 78b, as well as diffusion barrier layer portions 1086a and 1086b. Preferably, a seed layer of NiFe is sputter deposited over the electrically conductive materials in the central region and insulator material portions 78a and 78b, followed by plating a thick structure of NiFe over and in contact with the seed layer. In the present embodiment, conductive stud 950 is made of NiFe, but alternatively may be made with any suitable material. Conductive stud 950 may vary in thickness between, for example, about 5-40 μm or greater, and in the present embodiment has a thickness of about 20 μm.

Figure 19B:
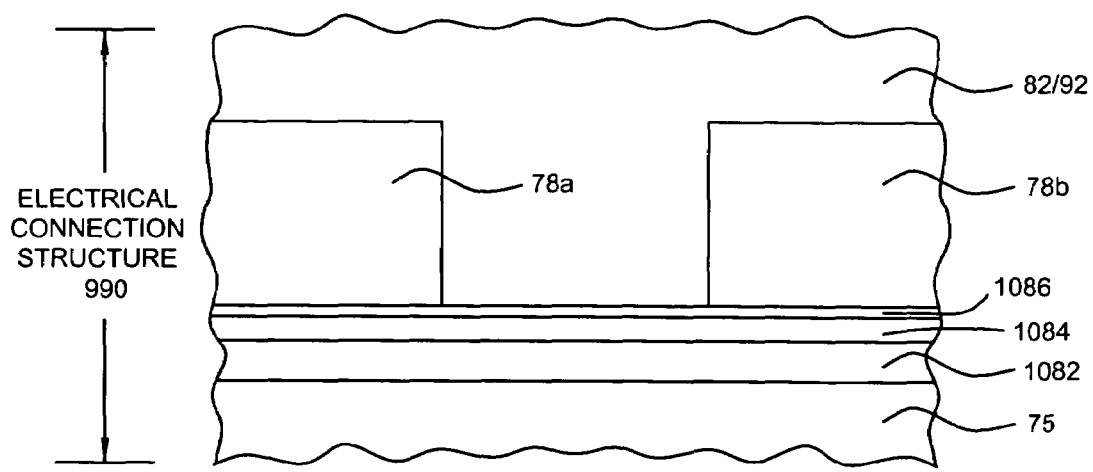

Referring now to FIG. 19b, corresponding to FIG. 10b, completed electrical connection structure 990 is shown. As discussed previously, electrically conductive diffusion barrier layer 1086 is used as an oxidation barrier layer for electrically conductive etch stop layer 1084 so that a remote portion of layer 82/92, including second shield layer 82 and first pole piece layer 92, serves as the second electrically conductive layer.

As discussed previously, electrical connection structures 980 and 990 of FIG. 19 may be used in a magnetic head contained within a disk drive. Alternatively, the second electrically conducting layer may be any electrically conducting portion formed within any suitable device. Electrical connection structures 980 and 990 may used in any technology where electrical coupling is needed from one component to another.

Final Comments. An electrical connection structure suitable for use in a magnetic head and disk drive, as well as a method of making the same, have been described. An electrically conductive etch stop layer is formed over a first electrically conductive layer. An electrically conductive diffusion barrier layer is then formed over the electrically conductive etch stop layer, followed by the formation of an insulator layer over the electrically conductive diffusion barrier layer. Next, a patterned photoresist is formed over left and right regions of the insulator layer so as to expose a central region of the insulator layer. Utilizing an etching process with the patterned photoresist in place, insulator materials of the insulator layer in the central region are removed to form a via which exposes electrically conductive materials in the central region. Finally, a second electrically conductive layer is formed within the via over the electrically conductive materials in the central region. Advantageously, the electrically conductive diffusion barrier layer reduces or eliminates oxidation of a top surface of the electrically conducting etch stop layer during the formation of the electrical connection.

It is to be understood that the above is merely a description of preferred embodiments of the invention and that various changes, alterations, and variations may be made without departing from the true spirit and scope of the invention as set for in the appended claims. For example, the conductive studs described herein may be utilized in any other suitable device, such as a semiconductor device. None of the terms or phrases in the specification and claims has been given any special particular meaning different from the plain language meaning to those skilled in the art, and therefore the specification is not to be used to define terms in an unduly narrow sense.

What is claimed is:

1. An electrical connection structure for use in providing an electrical connection for a component, the electrical connection structure comprising:
   a first electrically conductive layer formed over an electrical lead of the component;
   an electrically conductive etch stop layer formed over the first electrically conductive layer;
   an electrically conductive diffusion barrier layer comprising ruthenium (Ru) formed over the electrically conductive etch stop layer;
   a second electrically conductive layer comprising a via formed in contact with one of the electrically conductive diffusion barrier layer and the electrically conductive etch stop layer; and
   electrically insulative materials formed around the via and over the electrically conductive diffusion barrier layer.

2. The electrical connection structure of claim 1, wherein the electrically conductive etch stop layer comprises tantalum (Ta).

3. The electrical connection structure of claim 1, wherein the component comprises one of a read head and a write head.

4. The electrical connection structure of claim 1, wherein the electrically conductive diffusion barrier layer reduces or eliminates oxidation of a top surface of the electrically conductive etch stop layer.

5. The electrical connection structure of claim 1, wherein the component comprises a read sensor.

6. The electrical connection structure of claim 1, wherein the first electrically conductive layer comprises one of copper (Cu) and gold (Au).

7. The electrical connection structure of claim 1, further comprising:
   wherein the electrically conductive etch stop layer has a first etching property; and
   wherein the electrically conductive diffusion barrier layer has a second etching property different from the first etching property.

8. A magnetic head, comprising:
   at least one of a read head portion and a write head portion;
   an electrical connection structure which electrically connects the one of the read head portion and the write head portion to an electrical component;
   the electrical connection structure including:
      a first electrically conductive layer formed over an electrical lead of the one of the read head portion and the write head portion;
      an electrically conductive etch stop layer formed over the first electrically conductive layer;
      an electrically conductive diffusion barrier layer comprising ruthenium (Ru) formed over the electrically conductive etch stop layer;
      a second electrically conductive layer comprising a via formed in contact with one of the electrically conductive diffusion barrier layer and the electrically conductive etch stop layer; and
      electrically insulative materials formed around the via and over the electrically conductive diffusion barrier layer.

9. The magnetic head of claim 8, wherein the electrically conductive etch stop layer comprises tantalum (Ta).

10. The magnetic head of claim 8, wherein the one of the read head portion and the write head portion comprises a read sensor of the read head portion.

11. The magnetic head of claim 8, wherein the electrically conductive diffusion barrier layer reduces or eliminates oxidation of a top surface of the electrically conductive etch stop layer.

12. The magnetic head of claim 8, wherein the first electrically conductive layer comprises one of copper (Cu) and gold (Au).

13. The magnetic head of claim 8, wherein the via is formed contact with the electrically conductive etch stop layer.

14. The magnetic head of claim 8, wherein the electrically conductive etch stop layer has a first etching property; and wherein the electrically conductive diffusion barrier layer has a second etching property different from the first etching property.

15. A disk drive, comprising:
   at least one rotatable magnetic disk;
   a spindle supporting the at least one rotatable magnetic disk;
   a disk drive motor for rotating the at least one rotatable magnetic disk;
   a magnetic head for reading data from the at least one rotatable magnetic disk;
   a slider;
   at least one of a read head portion and a write head portion carried on the slider;
   an electrical connection structure for use in electrically coupling the one of the read head portion and the write head portion to an electrical component of the disk drive;
   the electrical connection structure including:
      a first electrically conductive layer formed over an electrical lead of the one of the read head portion and the write head portion;
      an electrically conductive etch stop layer formed over the first electrically conductive layer;
      an electrically conductive diffusion barrier layer formed over the electrically conductive etch stop layer;

a second electrically conductive layer comprising a via formed in contact with one of the electrically conductive diffusion barrier layer comprising ruthenium (Ru) and the electrically conductive etch stop layer; and electrically insulative materials formed around the via and over the electrically conductive diffusion barrier layer.

16. The disk drive of claim 15, wherein the electrically conductive etch stop layer comprises tantalum (Ta).

17. The disk drive of claim 15, wherein the one of the read head portion and the write head portion comprises a read sensor of the read head portion.

18. The disk drive of claim 15, wherein the electrically conductive diffusion barrier layer reduces or eliminates oxidation of a top surface of the electrically conductive etch stop layer.

19. The disk drive of claim 15, wherein the via is formed in contact with the electrically conductive etch stop layer.

20. The disk drive of claim 15, wherein the via is formed in contact with the electrically conductive diffusion barrier layer.

21. The disk drive of claim 15, wherein the lead comprises a lead layer structure extending from a read sensor of the read head portion.

* * * * *